(12) United States Patent
Brand et al.

(10) Patent No.: US 7,837,533 B2
(45) Date of Patent: Nov. 23, 2010

(54) APPARATUS FOR PROCESSING AND MEASURING WORKPIECES WHICH ARE PROVIDED WITH CUTTING TEETH

(75) Inventors: Stefan Brand, Mietingen-Walpertshofen (DE); Peter Bailer, Schemmerhofen-Altheim (DE); Norbert Bailer, Schemmerhofen-Altheim (DE); Siegfried Veil, Ochsenhausen (DE)

(73) Assignee: Vollmer Werke Maschinenfabrik GmbH (DE)

( * ) Notice: Subject to any disclaimer, the term of this patent is extended or adjusted under 35 U.S.C. 154(b) by 232 days.

(21) Appl. No.: 11/912,369

(22) PCT Filed: Apr. 27, 2006

(86) PCT No.: PCT/EP2006/003933

§ 371 (c)(1),
(2), (4) Date: Oct. 23, 2007

(87) PCT Pub. No.: WO2006/117133

PCT Pub. Date: Nov. 9, 2006

(65) Prior Publication Data

US 2008/0156125 A1    Jul. 3, 2008

(30) Foreign Application Priority Data

Apr. 29, 2005    (DE) .................. 10 2005 020 034

(51) Int. Cl.
*B24B 49/00*    (2006.01)
(52) U.S. Cl. .................. 451/5; 451/9; 451/10; 451/11; 451/215; 451/249
(58) Field of Classification Search ............ 451/5, 451/6, 8, 9, 10, 11, 179, 215, 242, 249
See application file for complete search history.

(56) References Cited

U.S. PATENT DOCUMENTS

| | | | | |
|---|---|---|---|---|
| 4,268,999 A | * | 5/1981 | Noto et al. | 451/5 |
| 4,348,838 A | * | 9/1982 | Tacchella | 451/150 |
| 4,501,092 A | * | 2/1985 | Archibald | 451/5 |
| 4,562,392 A | | 12/1985 | Davis et al. | |

(Continued)

FOREIGN PATENT DOCUMENTS

DE    87 13384    1/1988

(Continued)

*Primary Examiner*—Eileen P. Morgan
(74) *Attorney, Agent, or Firm*—Woodard, Emhardt, Moriarty, McNett & Henry LLP

(57)    ABSTRACT

The present invention relates to an apparatus (10) for processing and measuring workpieces, in particular plate-shaped or cylindrical workpieces, which are provided with cutting teeth (S), with a machine base (12), a processing and measuring device (14) which can be moved relative to the machine base (12), and a workpiece positioning device (16) which can be moved relative to the machine base (12), wherein the processing and measuring device (14) has a pivoting head (26) which can be moved relative to the machine base (12) such that it can pivot about a pivot axis (E1), wherein a processing tool (28) and a measuring probe (30) are provided on the pivoting head (26). In this case provision is made for the processing tool (28) to project from one side of the pivoting head (26) and for the measuring probe (30) to project from the side of the pivoting head (26) which is opposite with respect to the pivot axis (E1).

8 Claims, 4 Drawing Sheets

U.S. PATENT DOCUMENTS

Figure 1:
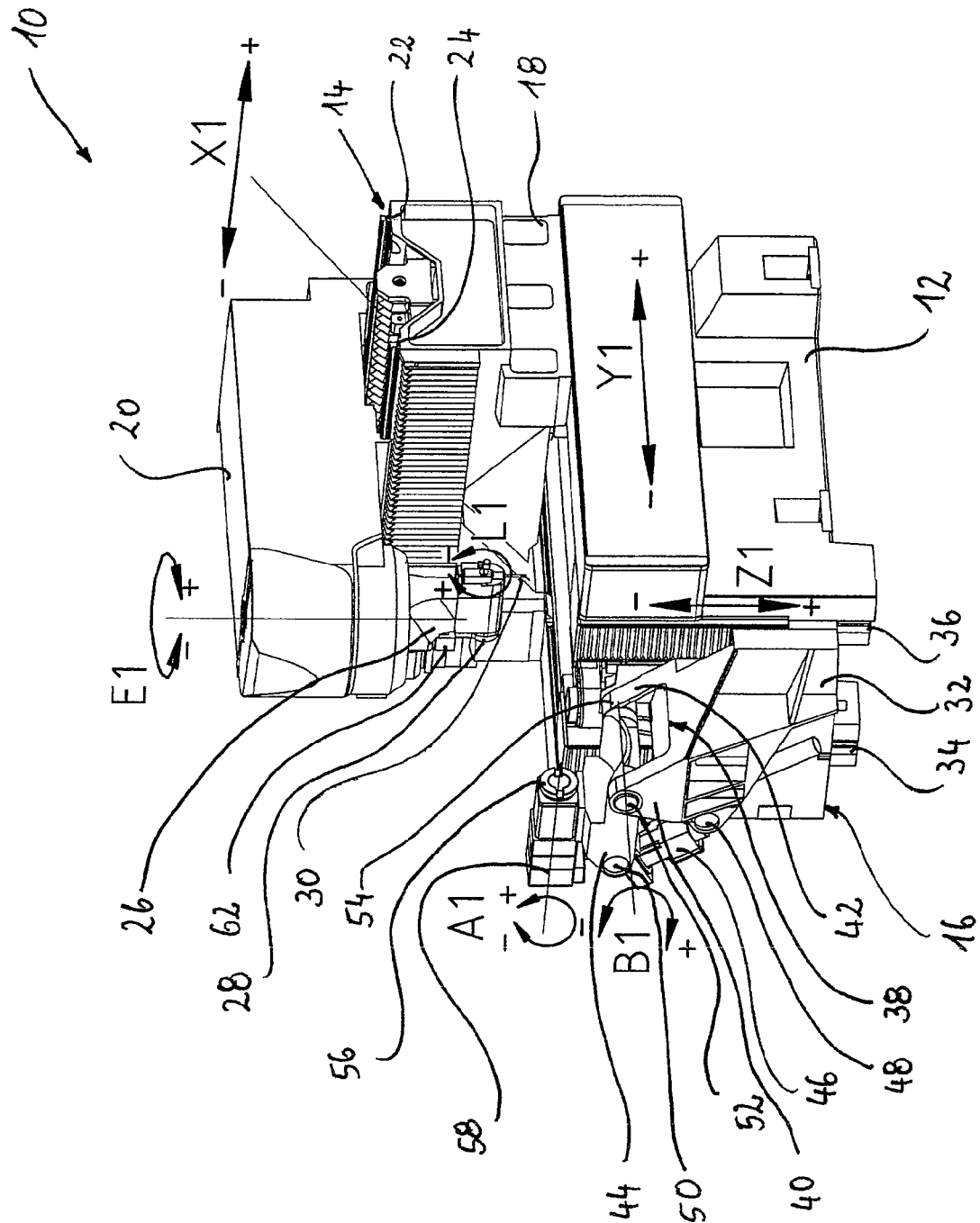

| | | | |
|---|---|---|---|
| 4,899,094 A | | 2/1990 | Pilborough |
| 5,058,433 A | * | 10/1991 | Wilson et al. .................. 73/651 |
| 5,076,022 A | * | 12/1991 | Ohta et al. ..................... 451/5 |
| 5,095,788 A | * | 3/1992 | Matoni ........................ 82/118 |
| 5,402,607 A | * | 4/1995 | Lombard ....................... 451/5 |
| 5,558,557 A | * | 9/1996 | Dashevsky .................... 451/10 |
| 5,896,296 A | * | 4/1999 | Corwin et al. ............... 700/195 |
| 6,302,764 B1 | * | 10/2001 | Wirz ........................... 451/11 |
| 6,840,720 B2 | * | 1/2005 | Mall ............................. 409/8 |
| 7,179,025 B2 | * | 2/2007 | Kreh ........................... 409/26 |
| 2005/0148286 A1 | * | 7/2005 | Saitoh ........................... 451/5 |
| 2006/0025050 A1 | * | 2/2006 | Yanase et al. .................. 451/5 |

FOREIGN PATENT DOCUMENTS

| | | |
|---|---|---|
| DE | 198 00 034 A1 | 7/1999 |
| DE | 198 46 944 A1 | 4/2000 |
| DE | 101 44 963 A1 | 3/2003 |
| EP | 0 292 081 A1 | 11/1988 |
| EP | 1 092 495 A1 | 4/2001 |
| EP | 1 273 392 A1 | 7/2001 |
| WO | WO 92/19410 | 11/1992 |

* cited by examiner

APPARATUS FOR PROCESSING AND MEASURING WORKPIECES WHICH ARE PROVIDED WITH CUTTING TEETH

REFERENCE TO RELATED APPLICATIONS

The present application is a national stage of International Patent Application PCT/EP2006/003933, filed 27 Apr. 2006, which claims the benefit of German Patent Application Serial No. 10 2005 020 034.6, filed 29 Apr. 2005, all of which are hereby incorporated by reference.

The present invention relates to an apparatus for processing and measuring workpieces, in particular plate-shaped or cylindrical workpieces, which are provided with cutting teeth, with a machine base, a processing and measuring device which can be moved relative to the machine base, and a workpiece positioning device which can be moved relative to the machine base, wherein the processing and measuring device has a pivoting head which can be moved relative to the machine base such that it can pivot about a pivot axis, wherein a processing tool and a measuring probe are provided on the pivoting head.

Apparatus of this kind are known from the prior art. For example, the prior art according to WO 92/19410, which constitutes the preamble, presents an apparatus in the case of which both a measuring probe and a wire electrode arrangement are arranged on the pivoting head so as to project in the direction of the pivot axis. This arrangement has the disadvantage of the measuring probe and the wire electrode arrangement standing inconveniently in the way in certain processing situations, so that extensive motions about and along the individual processing axes are required in order that the respective measuring task or processing task can be performed.

Also known from the document EP 1 273 392 A1 is an apparatus in the case of which both a processing tool, namely a grinding disc, and a measuring probe are attached to a processing device. The processing tool and the measuring probe are staggered by 90°. This arrangement also entails the disadvantage of the processing tool and the measuring probe standing inconveniently in the way in certain processing situations, which detracts from the range of uses of the machine which is shown here.

In contrast to this, an object of the present invention is to provide an apparatus of the type initially described in the case of which the inconvenient mutual influences of the processing device and the measuring probe can be largely prevented.

This object is achieved by an apparatus having the features of claim 1, wherein provision is made, in addition to the features initially mentioned, for the processing tool to project from one side of the pivoting head and for the measuring probe to project from the side of the pivoting head which is opposite with respect to the pivot axis.

The spectrum of use of the apparatus according to the invention can be increased in comparison with the prior art by the attachment according to the invention of the processing tool and the measuring probe to opposite sides of the pivoting head. The measuring probe and the processing tool no longer stand inconveniently in the way. According to the specific use, that is depending on whether a workpiece is to be processed or measured, the pivoting head is moved into a corresponding pivoted position, so that either the measuring probe or the processing tool can be brought into contact with the workpiece to be processed. The arrangement according to the invention also facilitates the measurement of differently configured workpieces, for example the measurement of cutting teeth of right-hand cutting or left-hand cutting workpieces.

The measuring probe and the processing tool can be brought into largely any desired angular positions relative to the workpiece to be processed through pivoting about the pivot axis, which further increases the field of use of the apparatus according to the invention.

According to one preferred embodiment of the invention, the processing tool is attached to the pivoting head so that it can be rotatably driven about a drive axis. It is in this respect possible for the drive axis to extend substantially orthogonally to the pivot axis. A compact arrangement of the individual drive apparatus for pivoting the pivoting head about the pivot axis or driving the processing tool about the drive axis can as a result be obtained.

It is also possible according to the invention for the processing tool to be an eroding electrode, preferably a rotating eroding disc. It is possible for the processing tool to be a grinding disc, so to speak.

As regards the measuring probe, in one development of the invention this is of angled formation and projects with its free end from the pivoting head. In this respect the measuring probe can in particular be oriented parallel to the pivot axis. In this case the measuring probe projects downwards from the pivoting head into the free space, so that easy access to the workpiece is guaranteed and rendered possible with short travels of the pivoting head. However other types of measuring probe, for example linear measuring probes, may also be provided, these projecting horizontally, perpendicularly or obliquely from the pivoting head, according to requirements. Instead of a mechanical measuring probe, it is also possible to use any other desired type of measuring device, e.g. an optical measuring probe (laser), which may be arranged parallel to the pivot axis or oriented in any other desired way. The apparatus according to the invention can as a result be specifically adapted to special processing and measuring situations.

Figure 5:
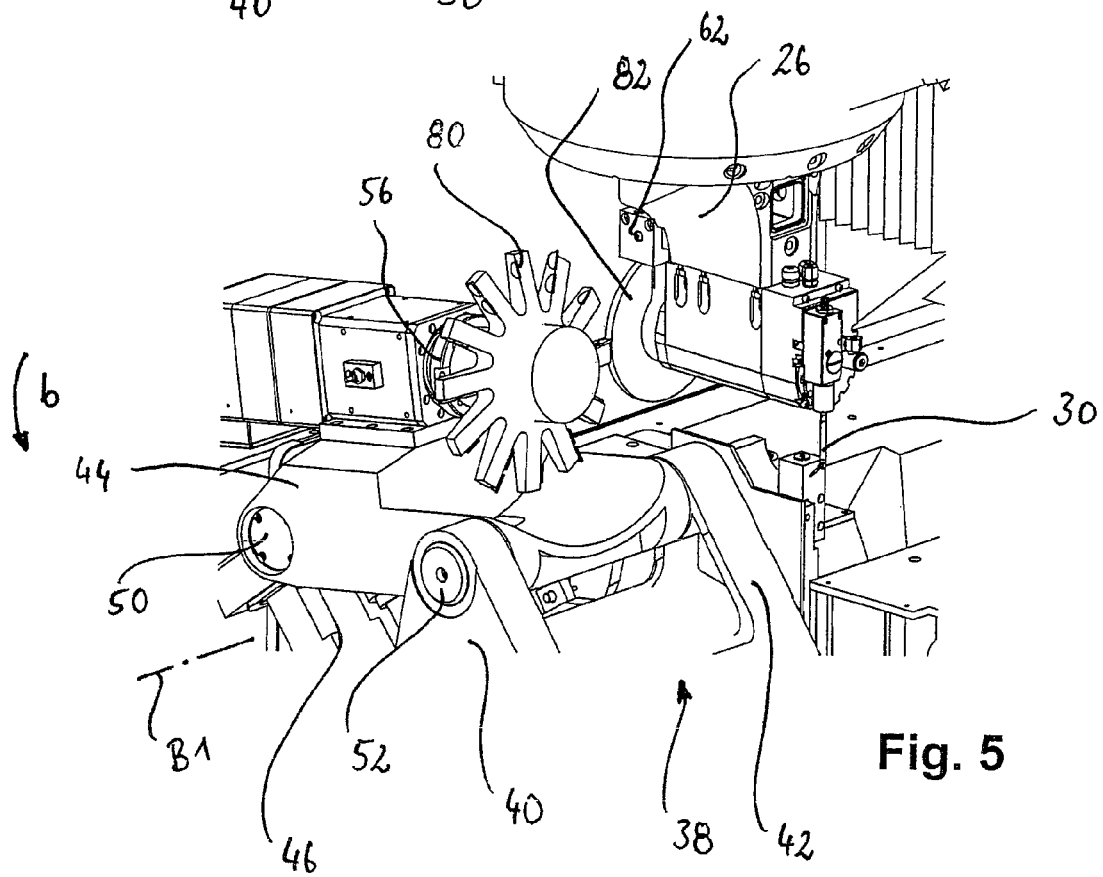
Figure 6:
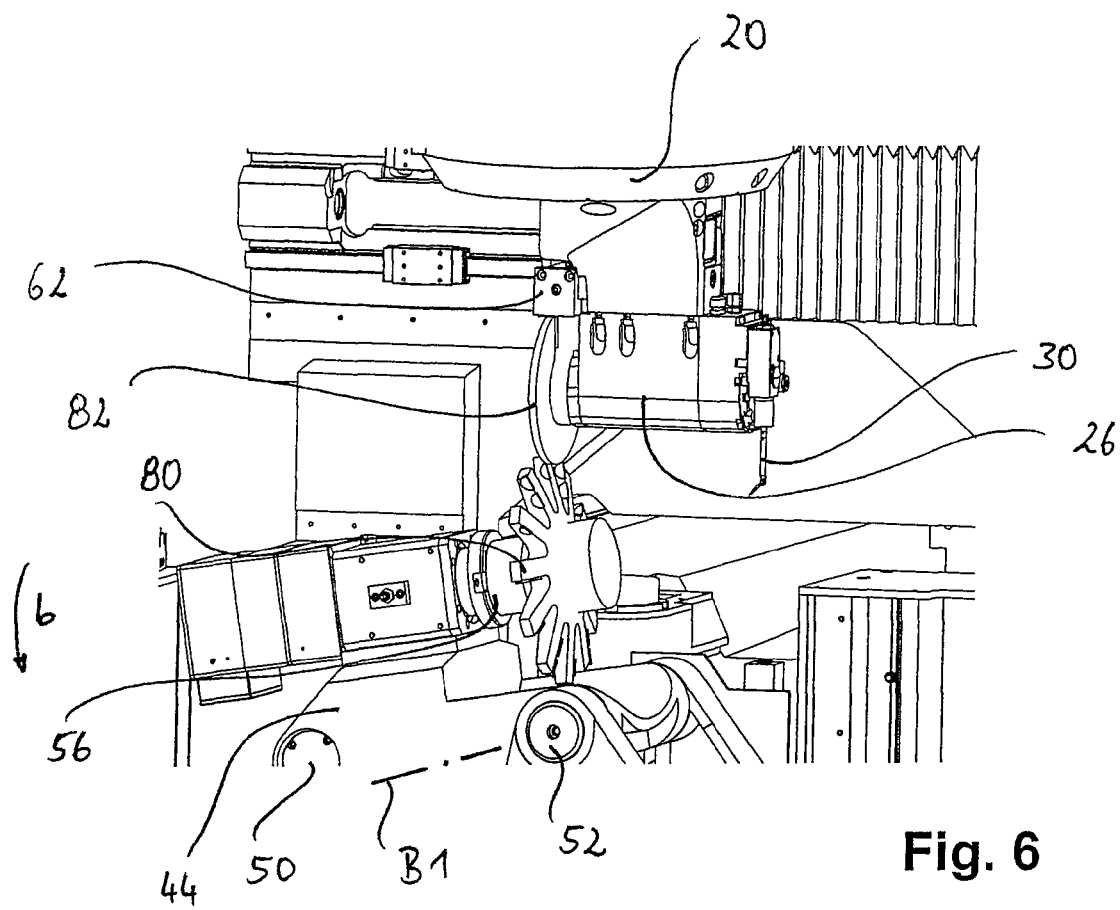
Figure 7:
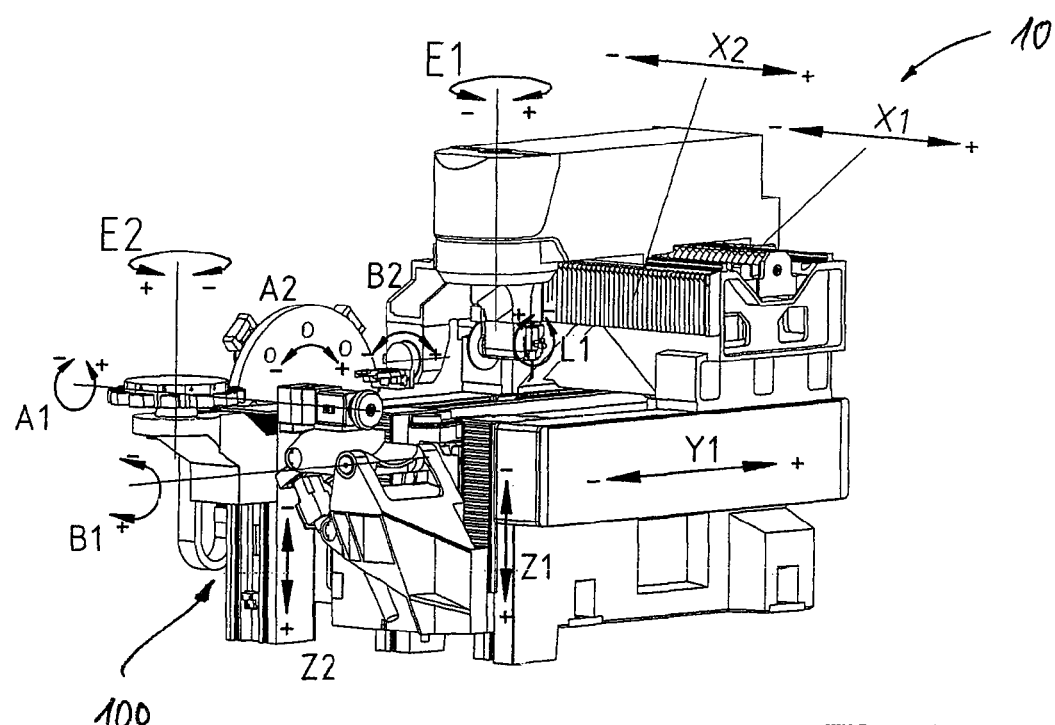

The invention is illustrated in the following on the basis of the accompanying figures, in which:

FIG. 1 is a perspective general representation of the apparatus according to the invention FIGS. 2 to 6 represent different processing situations and measuring situations in connection with the apparatus according to the invention and FIG. 7 represents a slightly modified embodiment of the apparatus according to the invention.

A general representation of the apparatus according to the invention is shown and generally denoted by 10 in FIG. 1. This comprises a machine base 12 which is firmly mounted on a foundation. A processing device 14 as well as a workpiece positioning device 16 are provided on the machine base 12. The processing device 14 comprises a processing bridge 18 which can be moved relative to the machine base 12 in a guided manner along the spatial axis Y1 through a controlled tool axis. Provided on the machine base 12 for this purpose are corresponding linear guides as well as a drive device which permit an exact linear movement of the processing arm 20 along the spatial axis Y1. A processing arm 20 is attached to the processing bridge 18. The processing arm 20 can be moved in a controlled manner on the processing bridge 18 along a spatial axis X1 which is orthogonal to the axis Y1. Provided for this purpose are linear guides 22 and 24 which permit an exact linear movement of the processing arm 20 along the spatial axis X1.

In FIG. 1 the processing arm 20 projects in a cantilevered manner to the left from the processing bridge 18. A processing unit formed as a pivoting head 26 is attached to the processing arm 20 at its free end. The pivoting head 26 can be pivoted about a pivot axis E1. The pivot axis E1 is substantially orthogonal to a virtual plane spanned by the two axes X1 and Y1. The pivoting head 26 can be pivoted over a range of up to 360° about the pivot axis E1 into any desired angular positions. An eroding disc 28 as well as a measuring probe 30 are attached to the pivoting head E1. The measuring probe 30 projects downwards from the end of the pivoting head 26 which is remote from the eroding disc 28. This arrangement of the measuring probe 30 enables a workpiece which is arranged below the pivoting head 26 to be easily accessed and the workpiece to be measured with short travels. The eroding disc 28 can be driven about a drive axis L1 via a rotary drive which is integrated into the pivoting head 26. The eroding disc 28 is attached to one side of the pivoting head 26 with respect to the pivot axis E1, whereas the measuring probe 30 is attached on the opposite side of the pivoting head 26 with respect to the pivot axis E1.

As is also shown by FIG. 1, the workpiece positioning device is arranged on a vertical side face on the machine base. This device comprises a bearing carriage 32. The bearing carriage 32 can be moved in a linear manner along a third spatial axis Z1 through corresponding control. Linear guides 34 and 36 are again attached to the machine base 12 for this purpose, these guides permitting an exact movement of the bearing carriage 32 along the vertical spatial axis Z1 via a corresponding drive device.

At its top end the bearing carriage 32 has a bearing fork 38 with a first bearing strut 40 and a second bearing strut 42. A free space is provided between the bearing struts 40 and 42, in which space a workpiece holding arrangement 44 is arranged. The workpiece holding arrangement 44 can be tilted through approximately ±30° in each case about a tilting axis B1. The tilting axis B1 extends substantially orthogonally to the third spatial axis Z1. In order to achieve an automated tilting motion, a controllable linear actuator 46 is provided, this being pivotably mounted with one of its ends in a pivot bearing 48 on the bearing carriage 32 and with its other end at a pivot bearing 50 on the workpiece holding arrangement 44. It should be added that the workpiece holding arrangement 44 is mounted within the bearing fork 38 via a movable bearing 52 and a fixed bearing 54.

A workpiece holding spindle 56, which can be rotatably driven, is provided on the workpiece holding arrangement 44. A rotary drive 58 attached for this purpose enables a disc-shaped workpiece which is to be processed, for example a circular saw blade 70 (see FIG. 2) to be sharpened through erosion processing, to be rotated about a workpiece rotational axis A1. The workpiece rotational axis A1 extends substantially orthogonally to the tilting axis B1.

FIG. 1 also shows a cooling fluid system 62 which is arranged in a fixed spatial association with the eroding disc 28 on the pivoting head 26. This means that a substantially constantly flowing cooling fluid jet can always flow against the eroding disc, irrespective of gravity influences, in each position of the pivoting head via the cooling fluid system 62. The motions of the pivoting head through movement along the spatial axes Y1 and X1 as well as through pivoting about the pivot axis E1 ensure that cooling fluid flows against the eroding disc 28 in a consistent and gravity-independent manner, so that a laminar cooling fluid flow can be obtained in the region of the eroding disc.

The apparatus according to the invention enables different types of measuring and processing tasks to be performed, these being discussed in the following on the basis of FIGS. 2 to 6 with continuous reference to the general representation according to FIG. 1.

Figure 2:
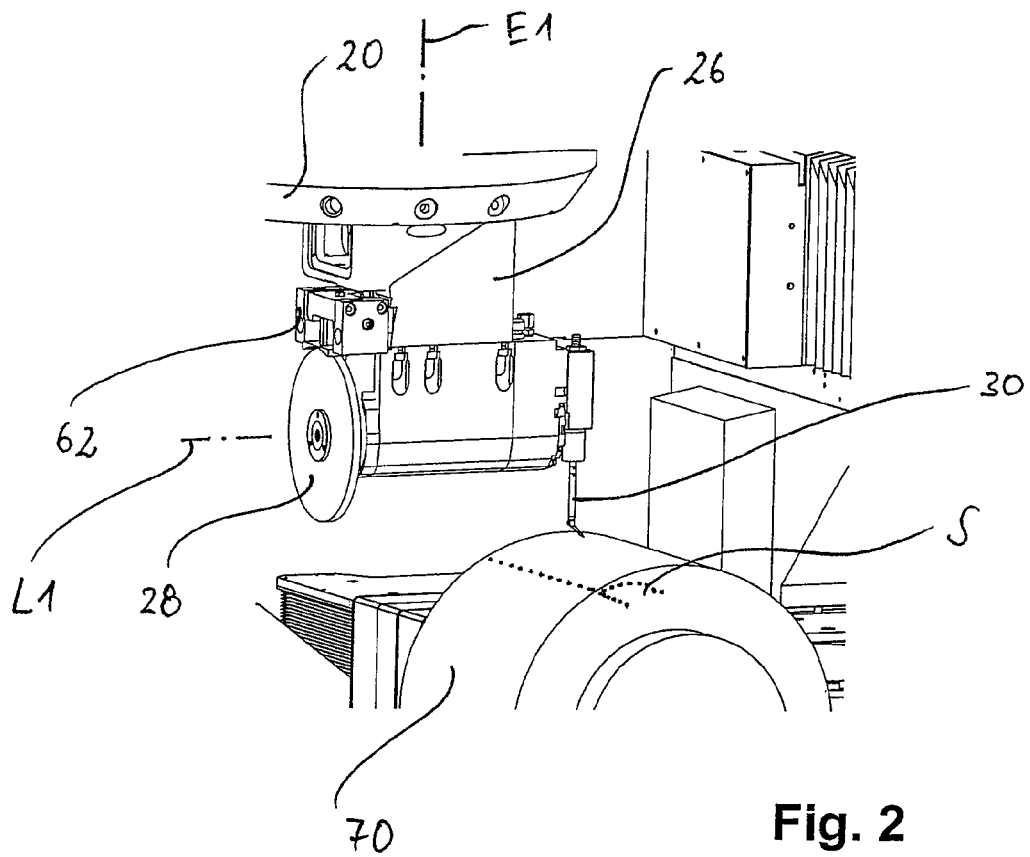
Figure 3:
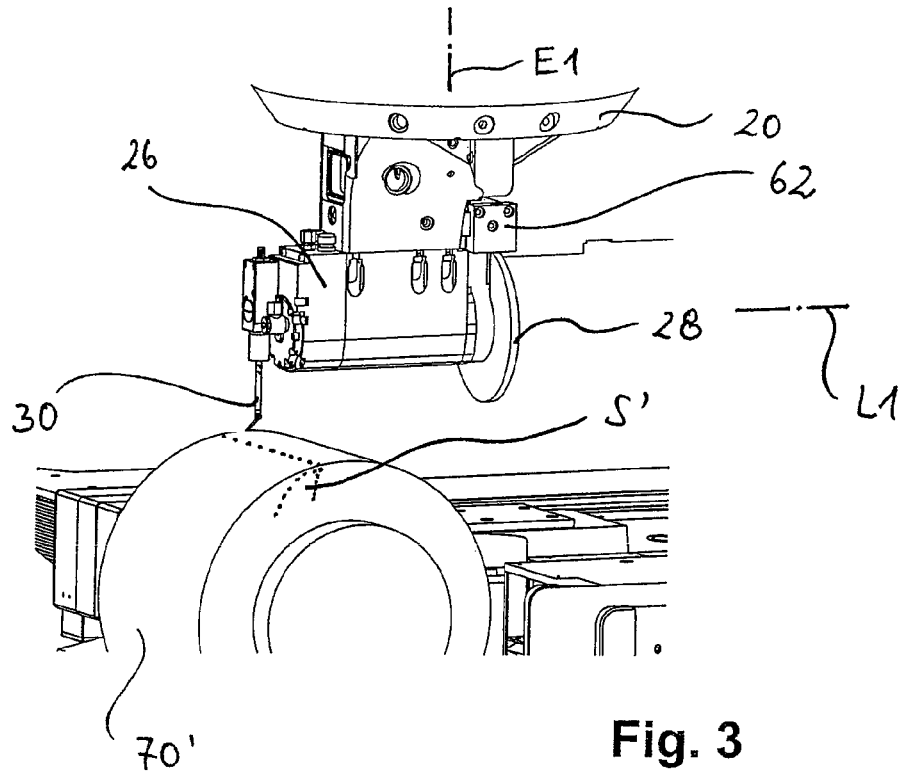

FIGS. 2 and 3 in each case show a specific use of the apparatus 10 according to the invention for measuring a cylindrical workpiece, for example an end milling cutter 70 (see FIG. 2) or 70' (see FIG. 3). The difference between the end milling cutters 70 and 70' lies in the fact that the end milling cutter 70 is of the right-hand cutting type, that is constructed with cutting teeth S according to FIG. 2. On the other hand, the end milling cutter 70' which is represented schematically in FIG. 3 is of the left-hand cutting type, that is formed with cutting teeth S' which are oriented in the opposite direction to the cutting teeth S from FIG. 2.

It can be seen from FIGS. 2 and 3 that the arrangement according to the invention of the measuring probe 30 and the processing tool 28 on opposite sides of the pivoting head 26 enables the measuring probe 30 to be pivoted into a position which is in each case suitable for measuring the workpiece 70 or 70'. It is as a result possible to directly perform measuring tasks on the workpiece 70 or 70' with different orientations of the measuring probe 30.

FIG. 2 shows, for example, a measuring situation in which the workpiece 70, formed as a right-hand cutting end milling cutter, is measured in its twelve o'clock position, that is in its vertically highest region, by means of the measuring probe 30. In contrast to this, in FIG. 3 the workpiece 70', formed as a left-hand cutting end milling cutter, is measured with the measuring probe 30 projecting downwards from the pivoting head 26, the pivoting head 26 having been pivoted through an angle of 180° about the axis E1.

Figure 4:
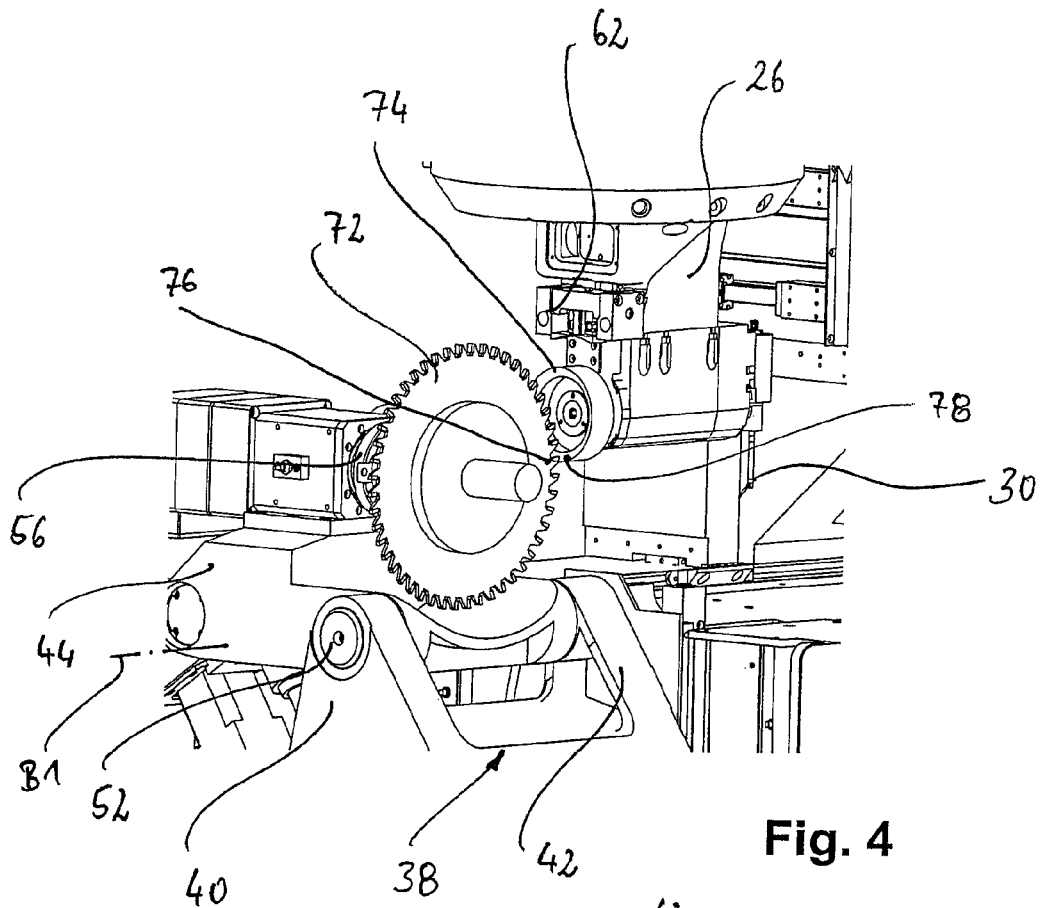

FIG. 4 shows a processing situation in which a circular saw blade 72 is processed with a rotating pot-shaped eroding disc 74, which is attached to the pivoting head 26. Processing takes place in a radially outer angular region 76 of the circular saw blade 72 which—on account of its position corresponding to an equivalent position on a face of a clock—is called a three o'clock position. The eroding disc 74 comes with its front side into contact with the circular saw blade 72 in a radial angular region 78 which—on account of its position corresponding to an equivalent position on a face of a clock—is called a six o'clock position.

The configuration according to the invention of the apparatus 10 enables the cutting tooth of the circular saw blade which is located in the angular region 76 at the time to be processed over its entire external front and side face region through appropriately moving the pivoting head 26 along the spatial axes X1 and Y1 and through pivoting about the pivot axis E1. The circular saw blade 72 can in this case remain in the position which is shown in FIG. 4. The eroding disc 74 likewise always comes into contact with the cutting tooth to be processed which lies in the angular region 76 only in the angular region 78 of the eroding disc 74, which leads to high-quality processing results. This is guaranteed by the distribution according to the invention of the individual processing axes over the processing device 14 on the one hand and the workpiece positioning device 16 on the other. Moreover, the arrangement according to the invention of the measuring probe 30 at the end of the pivoting head 26 which is remote from the eroding disc 74 ensures that the measuring probe 30 does not interact inconveniently with another machine component during processing of this kind.

It is to be noted that no tilting about the tilting axis B1 takes place in the representation according to FIG. 4.

FIG. 5 shows a processing situation which differs from the processing situation according to FIG. 4. A so-called flattening milling cutter 80 is processed with a disc-shaped eroding disc 82 in the processing situation according to FIG. 5. The special feature of the flattening milling cutter 80 lies in its inclined front face, which necessitates tilting of the workpiece holding arrangement 44 about the tilting axis B1 for processing in the position which is shown in FIG. 5. This is indicated by the arrow b in FIG. 5. It can also be seen that, although the flattening milling cutter 80, in the same way as the circular saw blade 72 in FIG. 4, is processed in its three o'clock position, the eroding disc 82 contacts the flattening milling cutter 80 in its three o'clock position with its circumferential surface.

FIG. 6 shows a processing situation in which the flattening milling cutter 80 according to FIG. 5 is processed in its twelve o'clock position. The eroding disc 82 comes into contact with the flattening milling cutter 80 with its front side in the region of its six o'clock position. The flattening milling cutter 80 is also inclined in this processing situation through pivoting the workpiece holding arrangement 44 about the pivot axis B1 according to the arrow b.

It is understood that the representations according to FIGS. 2 to 6 merely provide a general view showing that a plurality of processing tasks and measuring tasks can be performed on workpieces of the most varied geometry and having the most varied purposes with the apparatus 10 according to the invention. The arrangement according to the invention of the processing and the rotational axes or pivot axes as well as the arrangement according to the invention of the eroding disc and the measuring probe on the pivoting head 26 have the advantage of the respective workpiece to be processed in each case being accessible over an angular region from its three o'clock position via its twelve o'clock position to its nine o'clock position on both front sides and on its circumferential side, and of the possibility of carrying out the processing with an eroding disc such that the eroding disc can contact the workpiece to be processed at the front sides as well as with its circumferential surface in an angular region between its three o'clock position via its six o'clock position to its nine o'clock position. Also to be noted is the possibility of tilting the workpiece to be processed about the tilting axis B1, which opens up further processing possibilities, as shown in FIGS. 5 and 6.

In other words, if the pivoting head and the workpiece are moved relative to one another such that the workpiece can be contacted in its circumferential region starting from the vertex, called the twelve o'clock position, on both sides of the vertex in an angular region between the three o'clock position and the nine o'clock position for processing with the processing tool or for measuring with the measuring probe. This results in an extremely flexible range of uses, allowing a plurality of workpieces of differing geometry to be processed and measured.

A further important aspect of the invention consists in the fact that the cooling fluid system 62 lies in a fixed spatial association with the eroding disc 74 or 82 which is used in each case. It is as a result possible to ensure that a cooling fluid flow which is substantially constant in terms of angle of incidence and point of incidence can always flow against the eroding disc 74, so that air bubbles at the eroding point, which must be avoided without exception for a high-quality eroding result, can be reliably prevented. According to the invention, a consistent cooling fluid flow can always be obtained at the eroding point without a significant expenditure. It is to be mentioned in this connection that tilting of the pivoting head, as is known, for example, from the prior art, leads to gravity-induced changes in terms of the angle of incidence and the point of incidence and therefore at least renders the achievement of a consistent laminar cooling fluid flow more difficult.

FIG. 7 shows the arrangement according to FIG. 1, with a workpiece and tool loading system 100 additionally being provided. This comprises a number of further axes of movement and pivot axes, which are all given the number "2". However the mode of operation of the apparatus 10 according to the invention according to the preceding description remains unchanged.

The invention claimed is:

1. Apparatus (10) for processing and measuring workpieces, in particular plate-shaped or cylindrical workpieces, which are provided with cutting teeth (S), the apparatus comprising:
   a machine base (12) having and extending along a horizontal x-axis, a horizontal y-axis and a vertical z-axis which are orthogonal to each other,
   a processing and measuring device (14) movably mounted to the machine base and which can be moved relative to the machine base (12) along the x-axis and y-axis, and,
   a workpiece positioning device (16) movably mounted to the machine base and which can be moved relative to the machine base (12) along the z-axis,
   wherein the processing and measuring device (14) has a pivoting head (26) which can be moved relative to the machine base (12) such that it can move along the x-axis and y-axis and pivot about a pivot axis (E1) extending along the z-axis, wherein a single processing tool (28) and a measuring probe (30) are provided on the pivoting head (26),
   wherein the single processing tool (28) projects from one side of the pivoting head (26), and that the measuring probe (30) projects from the side of the pivoting head (26) which is opposite with respect to the pivot axis (E1), wherein relative motion between the pivoting head (26) and the workpiece positioning device holding the workpiece can occur linearly along the x-axis, y-axis, z-axis and pivotally about the z-axis such that the workpiece is contacted by processing tool (28) or the measuring probe (30) in an angular range of 180°, extending by 90° respectively on both sides of the vertically highest vertex region of said workpiece.

2. Apparatus (10) according to claim 1, wherein the processing tool (28) is attached to the pivoting head (26) so that it can be rotatably driven about a drive axis (L1).

3. Apparatus (10) according to claim 2, wherein the drive axis (L1) extends substantially orthogonally to the pivot axis (E1).

4. Apparatus (10) according to claim 1, wherein the processing tool is an eroding electrode (28).

5. Apparatus (10) according to claim 2, wherein the processing tool is a grinding disc.

6. Apparatus (10) according to claim 1, wherein the measuring probe (30) is of angled formation and projects with its free end from the pivoting head (26).

7. Apparatus according to claim 1, wherein the workpiece positioning device has a holder for holding the workpiece that is pivotable about the y-axis such that the workpiece may be contacted for processing by the processing tool (28) or for measuring by the measuring probe (30).

8. Apparatus according to claim 1, wherein the workpiece positioning device is moveable vertically.

* * * * *